United States Patent [19]
Strout et al.

[11] 4,001,883
[45] Jan. 4, 1977

[54] HIGH DENSITY DATA STORAGE ON MAGNETIC DISK

[75] Inventors: Frederick D. Strout, Phoenix; Jaime Calle, Glendale; Edwin W. Herron, Phoenix, all of Ariz.

[73] Assignee: Honeywell Information Systems Inc., Phoenix, Ariz.

[22] Filed: Mar. 7, 1974

[21] Appl. No.: 448,863

[52] U.S. Cl. .............................................. 360/48
[51] Int. Cl.² ........................................ G11B 5/09
[58] Field of Search ........................... 360/48, 49

[56] References Cited
UNITED STATES PATENTS

| | | | |
|---|---|---|---|
| 3,439,344 | 4/1969 | Stanga | 360/48 |
| 3,641,534 | 2/1972 | Irwin | 360/48 |
| 3,688,286 | 8/1972 | Bennett | 360/48 |
| 3,778,787 | 12/1973 | Cannon | 360/53 |

*Primary Examiner*—Vincent P. Canney
*Attorney, Agent, or Firm*—William W. Holloway, Jr.; Walter W. Nielsen; Henry K. Woodward

[57] ABSTRACT

High density data storage is permitted on magnetic disk by providing uniform length data sectors and by grouping a plurality of data sectors with a single header. Any data sector may be accessed through location of the desired group header and counting to the position of the sector.

3 Claims, 7 Drawing Figures

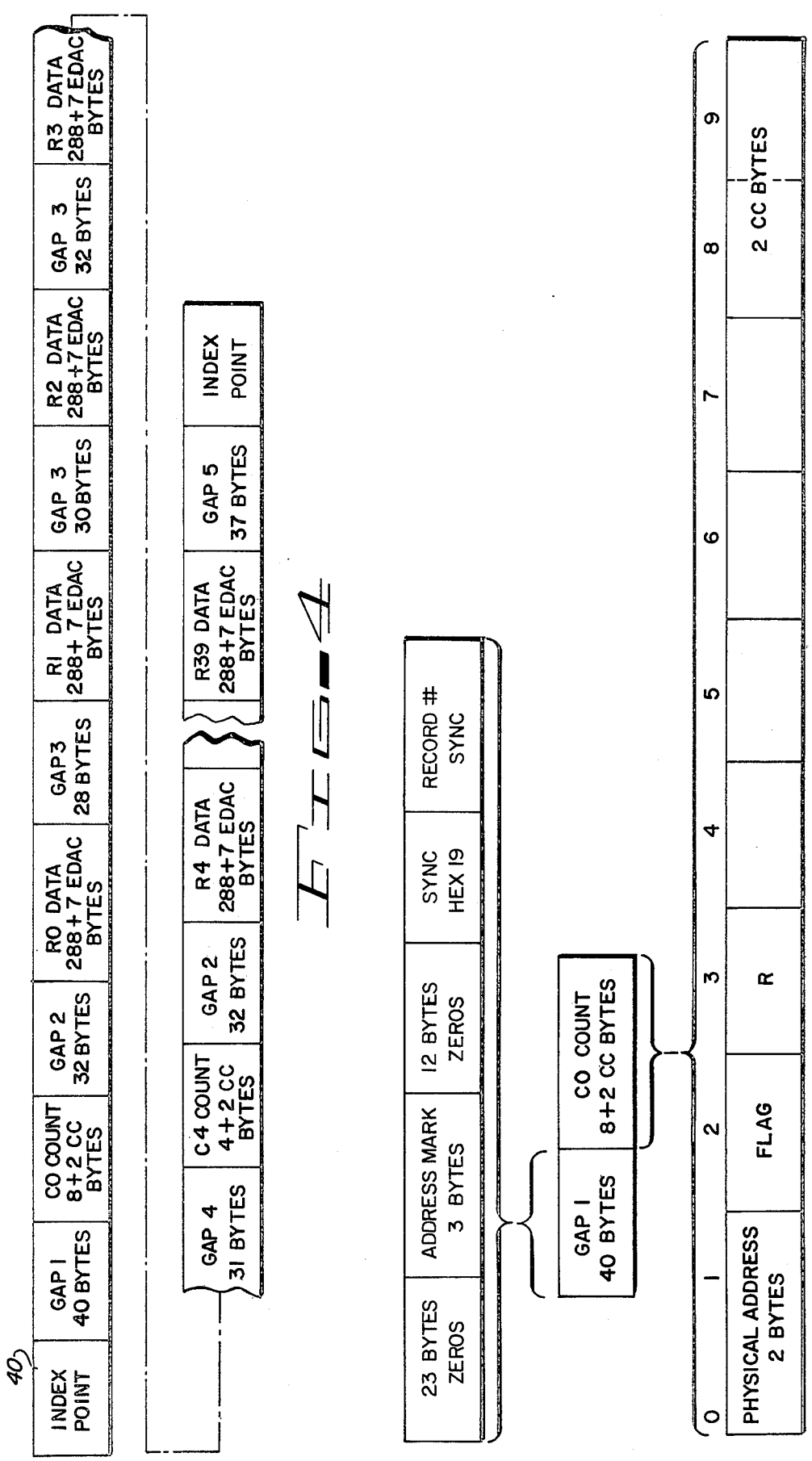

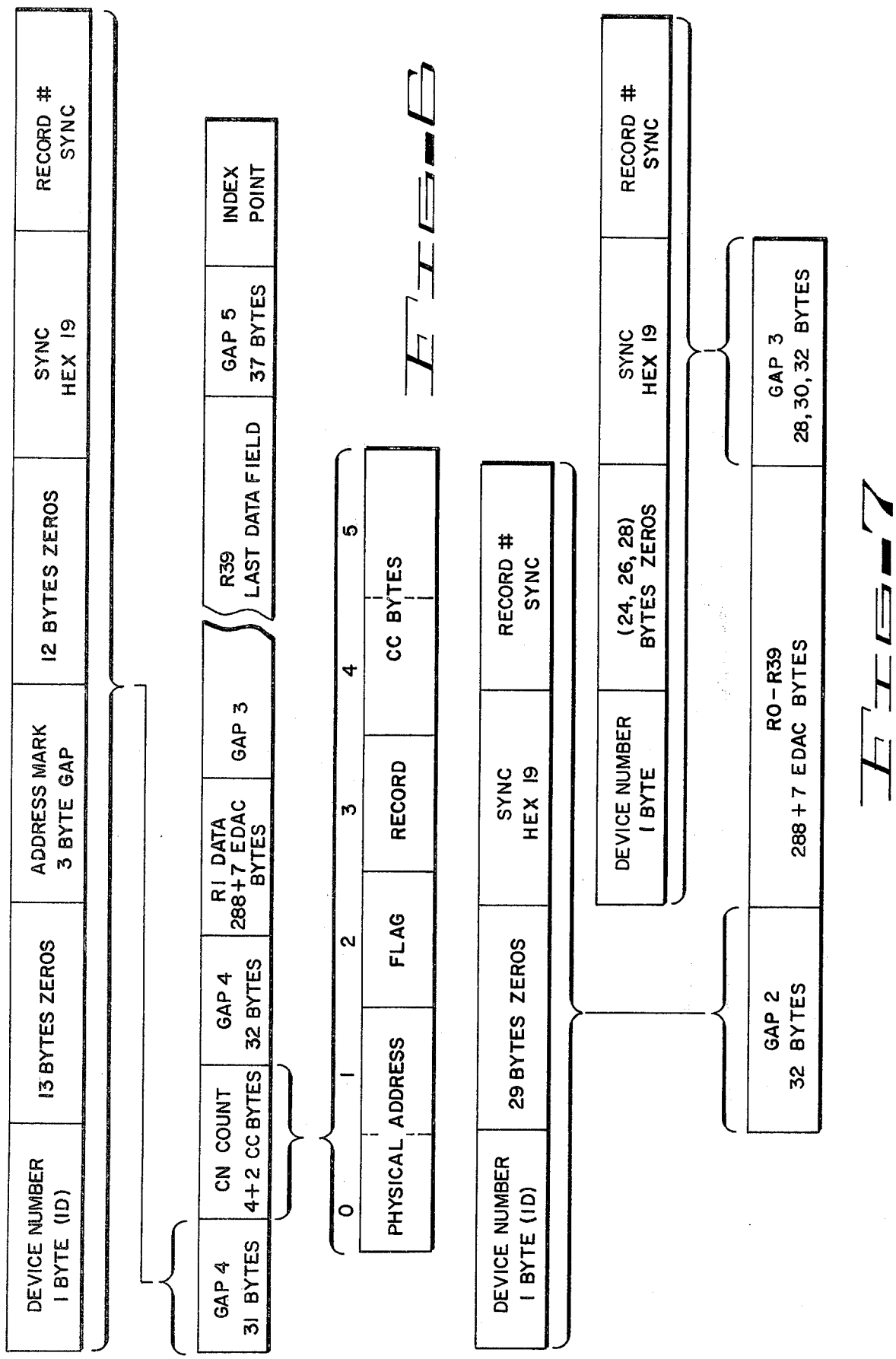

HIGH DENSITY DATA STORAGE ON MAGNETIC DISK

BACKGROUND OF THE INVENTION

This invention relates generally to magnetic recording of digital information, and more particularly to the recording of such information on magnetic disk files.

The magnetic disk file is a form of magnetic memory which is designed to permit relatively rapid random access of a large capacity of storage either for reading or writing of information. Physically, the file unit comprises a plurality of disks which are mounted upon a common shaft. Each disk has a magnetic recording layer (e.g. iron oxide) with recording tracks defined on either side of each disk. Magnetic heads are utilized to access the tracks as the disks are rotated.

Data is entered on the disk tracks in accessible sectors with identification headers provided for the sectors. As used herein "sector" or "record" is a set of data spaced from other data which may be randomly accessed for either reading or writing. Initially, when the lower density of data permitted greater tolerances in head placement for access, the headers for the data sectors could be placed on one disk surface and the data sectors on another disk surface. However, with the increasing density of data on the disks, the identification headers necessarily had to be placed on the same disk along with the data sectors.

Heretofore, each sector has been provided with its own identification header which precedes the sector on its record track. Not only does the header provide sector identification but the header also provides information as to the availability of the sector for record use and information regarding the chaining or linking of the sector with other sectors or related data storage. Further, many disk units permit variable length data sectors, and the sector headers must describe the storage capacity of its associated sector.

Since the header provides information as to the availability and capacity of the following data sector, along with chaining information, a gap must be provided after the header to allow sufficient time for the system control logic to make decisions relative to the availability of the sector and to initiate the control for reading or writing in the sector. Further, a sufficient length gap must be provided after each data sector to allow the system control logic to make decisions as to the validity of the previous information. Additionally, the gap lengths accommodate variations caused by asynchronous timing between the disk controller and the disk unit and inherent delay variations between disk drives due to circuit and cable delays.

Thus, the actual data information capacity of a disk is limited due to the necessity of providing headers and gaps for control logic decision time.

SUMMARY OF THE INVENTION

An object of the present invention is the provision of increased data storage capacity in magnetic disk files.

Another object of the invention is a method of storing data on magnetic disk with a reduced space requirement for data sector identification and logic decision.

Briefly, in accordance with the invention a magnetic disk is provided in which all data sectors are a fixed uniform length. Thus, the requirements for providing storage capacity descriptions is obviated and the required headers may be only a small fraction in size of conventional headers. Additionally, a plurality of data sectors are grouped together with a single header providing identification information. Thus, a reduction in size and number of headers and gaps is effected along with a corresponding increase in data storage capacity.

The invention and objects and features thereof will be more fully understood from the following detailed description and appended claims when taken with the drawings.

BRIEF DESCRIPTION OF THE DRAWINGS

FIG. 4 is a more detailed format of one embodiment of the format of data of FIG. 3;

FIG. 5 is a more detailed format of one embodiment of a header of FIG. 4;

FIG. 6 is a more detailed format of one embodiment of other headers of FIG. 4; and FIG. 7 is a more detailed format of one embodiment of the data sectors of FIG. 4.

DESCRIPTION OF ILLUSTRATIVE EMBODIMENTS

Figure 1:
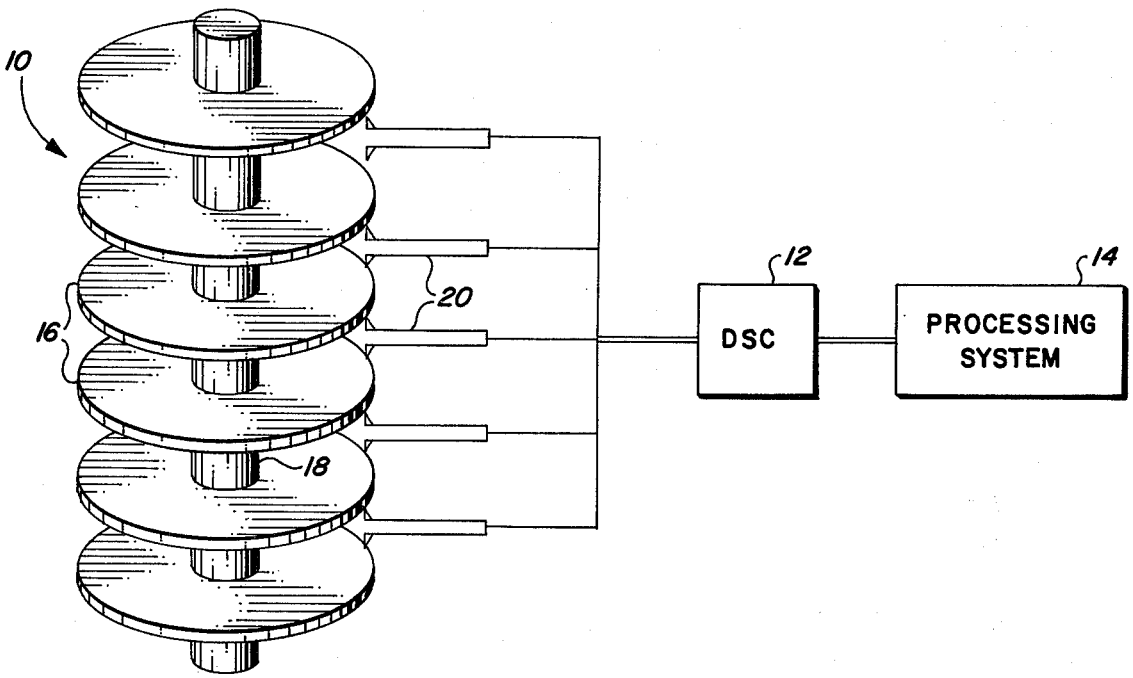
FIG. 1 is a perspective functional diagram of a conventional plural disk storage unit.

FIG. 1 is a persective functional diagram of a conventional plural disk storage unit shown generally at 10 which is interconnected through a disk storage control unit (DSC) 12 to the computer processing system 14. The DSC contains the electronic logic circuitry which controls the transfer of data between the storage unit and the processing system. In this illustrative embodiment, the disk storage unit 10 comprises six disks 16 which are mounted upon a common shaft 18. Magnetic heads 20 are interconnected with DSC 12 to read or write data on the disk surfaces as commanded by DSC 12. In operation, the disks 16 are rotated at a relatively high constant velocity (e.g. 1200 rpm) and the heads 20 are translated across the surfaces of the disks for selectively reading or writing data. The data is stored on concentric circular tracks on the surface of the disks. There may be on the order of 400 tracks per disk surface with the corresponding tracks on each of the disks defining identifiable cylinders. Typically, one disk surface contains servo control and clocking information.

Figure 2:
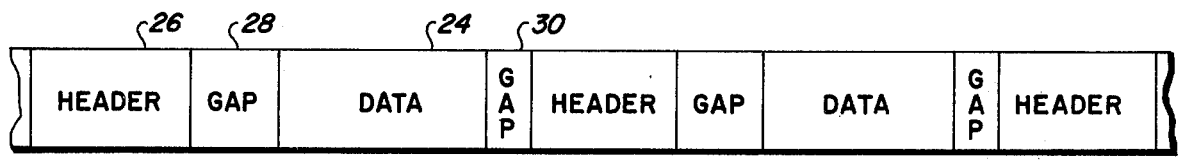
FIG. 2 is a conventional format of data as stored on magnetic disks.

As described above, data is stored on the individual tracks in accessible sectors. Headers are provided along with the data sectors for sector identification and description. Heretofore, each sector is provided with its own identification header which precedes the sector on its record track. FIG. 2 is a conventional format of data as stored on a track of a magnetic disk with each data sector being provided with its own identification header which precedes the sector on its record track. The header not only provides sector identification but also information as to the availability of the sector for record use and information regarding the chaining or linking of the sector with other sectors for related data storage. Additionally, the header may contain information on the storage capacity of the data sector when variable length data sectors are utilized. A gap 28 is provided between header 26 and its associated data sector 24 which is of sufficient length for the system control logic to make decisions as to the availability of data sector 24 and to initiate the control for reading or writing sector 24. Additionally, gap 30 is provided after data sector 24 and before the following header to allow sufficient time for the system control logic to make decisions relative to the validity of the information written or retrieved from data sector 24.

While the data format of FIG. 2 allows a degree of flexibility in the use of the data sectors, the actual data information capacity of the disk is limited due to the necessity of providing individual headers and longer gaps for control logic decision time.

Figure 3:
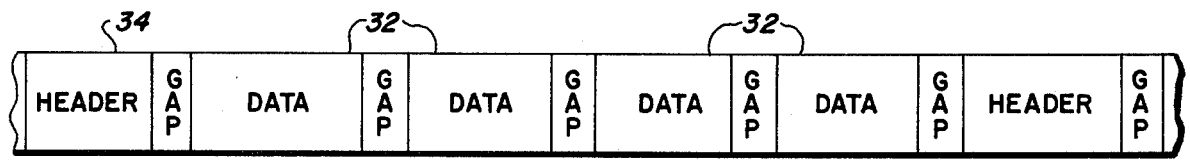
FIG. 3 is a format of data as stored on magnetic disk in accordance with the present invention.

Referring now to FIG. 3, in accordance with the present invention the data sectors 32 are a fixed uniform length. Thus, the requirements for providing storage capacity descriptions is obviated. Additionally, the plurality of data sectors 32 are grouped together with a single header 34 provided for location and identification. By so grouping data sectors of uniform length, a reduction in size and number of headers and gaps is effected along with the corresponding increase in data storage capacity.

Consider now FIG. 4 which is a more detailed format of one embodiment of the format of FIG. 3. This format is designed for use with a disk having 411 tracks per surface with each track having forty data sectors with one header provided for a group of four data sectors. Each data sector has a capacity of 288 data bytes (eight bits per byte) and seven error detection and correction bytes (EDAC). The beginning of each track is provided with a mechanical or electrical index point 40 which is followed by the initial gap 1 of 40 bytes length. Following gap 1 is the first header labeled C0 count which consists of ten bytes as described further hereinbelow with reference to FIG. 5. The gap labeled gap 2 follows the initial header C0 and precedes the initial data sector R0 which consists of 288 data bytes and 7 EDAC bytes. Between the data sectors in each group are gaps labeled gap 3 which vary in length from 28 bytes to 32 bytes in order to accommodate mechanical jitter and lineup tolerances in accessing the data sectors of each group. Following the fourth data sector R3 of the group is a gap labeled gap 4 which consists of 31 bytes as more fully described hereinbelow with reference to FIG. 6. The same general format is followed throughout the track with the final data sector labeled R39 being followed by a gap labeled gap 5 consisting of 37 bytes.

Referring now to FIG. 5, the format of gap 1 and the initial header C0 are shown in more detail. Gap 1 consisting of 40 bytes precedes the initial header C0 and includes 12 bytes of zeros used to sync a phase-locked oscillator (PLO). The 12 bytes of zeros are followed by a hexadecimal 19, and the decoding of hex 19 indicates PLO synchronization and the beginning of recorded information. The hex 19 is followed by the following sector number (0-39) and sync. The initial count header C0 consists of 10 bytes and is longer than the following count headers on the track as the C0 header describes the condition of the track and the physical address of an alternative track. As indicated, the first two bytes of the C0 header provide the physical address with the third byte providing a flag which indicates whether or not the particular track is normal or defective. The next byte after the flag provides the record number and the four bytes following the record number provide an alternate address if the track is defective. The last two bytes of header C0 are CC bytes which are used for error detection in the system.

FIG. 6 is a more detailed format of one embodiment of all succeeding count headers and the gap 4 which precedes these headers. As shown therein, gap 4 includes a 1 byte write device identification number followed by 13 bytes of zeros which are provided for splice when the preceding data sector is to be rewritten with new data. The next three bytes provide address marks which are used to find the start of the following count header without waiting for the track index. The remaining portion of gap 4 includes 12 zero bytes for PLO synchronization followed by a hexadecimal 19 and the following sector number.

The Following count header designated CN conists of only six bytes as the alternate track address is not required. The first two bytes define the track physical address (e.g. head number and cylinder) and the third byte again provides a flag indicating whether or not the track is normal or defective. The fourth byte provides the number of the header and the last two bytes are used for error detection.

The data sector, gap 2, and gap 3 (with reference to FIG. 4) are illustrated in FIG. 7. Gap 2, which follows all headers, includes 32 bytes with the first byte identifying the device and channel number used when this byte was written on the track. The next 29 bytes are zeros and provide an area for making splices. The gap ends with a hexadecimal 19 for synchronization and the following sector number. Each data sector includes 288 bytes of data and 7 EDAC bytes. Between each data sector is a gap 3 which may be 28 to 32 bytes in length and which provides device number and 24-28 bytes of zeros for synchronization. Again, the gap is ended with a hexadecimal 19 for synchronization and the following sector number.

Any data sector may be accessed through location of the group header and counting to the position of the sector. Synchronization is provided by the sync byte of the preceding gap. Fewer headers are required and each header may be shorter than the headers used with variable length data sectors. Thus, data formats in accordance with the present invention have proved to be very efficient in storing data on magnetic disks. While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim:

1. The method of high density storage of data in individually retrievable data sectors on a magnetic recording medium comprising the steps of magnetically recording a header for identifying a plurality of data sectors, magnetically recording after said header and in association therewith a plurality of uniform length data sectors each identifiable from said header and individually retrievable for read and record operations, and providing a gap before and after each data sector to facilitate said read and record operations of a data sector without affecting adjacent data sectors.

2. The method defined by claim 1 wherein said gap includes a splice area, synchronization, and number identifying the following sector.

3. The method defined by claim 2 wherein said headers indicate track address and track condition and at least one header per track indicates an alternate track address if the track condition is defective.

* * * * *